United States Patent [19]
Bindl et al.

[11] Patent Number: 5,302,659
[45] Date of Patent: Apr. 12, 1994

[54] EMULSIONS COMPRISING ACYLATED AMINO-FUNCTIONAL ORGANOPOLYSILOXANE

[75] Inventors: Johann Bindl, Burghausen; Hans-Juergen Lautenschlager, Haiming, both of Fed. Rep. of Germany; Karl Huhn, Adrian, Mich.; Kiyoshi Ninomiya, Tokyo, Japan

[73] Assignee: Wacker-Chemie GmbH, Munich, Fed. Rep. of Germany

[21] Appl. No.: 35,108

[22] Filed: Mar. 19, 1993

[30] Foreign Application Priority Data
Apr. 3, 1992 [DE] Fed. Rep. of Germany ....... 4211269

[51] Int. Cl.$^5$ .............................................. C08L 83/00
[52] U.S. Cl. .................................. 524/838; 524/588; 524/837; 427/387
[58] Field of Search .................. 524/588, 837, 838; 427/387

[56] References Cited

U.S. PATENT DOCUMENTS 5,039,738  8/1991  Czech .

FOREIGN PATENT DOCUMENTS

| 0095676 | 12/1983 | European Pat. Off. . |
| 0161888 | 11/1985 | European Pat. Off. . |
| 0342830 | 11/1989 | European Pat. Off. . |
| 0342834 | 11/1989 | European Pat. Off. . |
| 0349753 | 1/1990 | European Pat. Off. . |
| 0349754 | 1/1990 | European Pat. Off. . |
| 101076 | 6/1982 | Japan . |
| 47371 | 2/1990 | Japan . |

OTHER PUBLICATIONS

Derwent Abstract to JP-A-2-47371 (Feb. 1990).

Primary Examiner—Melvyn I. Marquis

[57] ABSTRACT

Emulsions which are prepared by reacting (A) an organopolysiloxane which has at least one monovalent SiC-bonded radical with primary and/or secondary amino groups, with (B) a carboxylic acid anhydride in the presence of (C) an emulsifier and (D) an aqueous phase. These emulsions are suitable as textile treating agents.

7 Claims, No Drawings

EMULSIONS COMPRISING ACYLATED AMINO-FUNCTIONAL ORGANOPOLYSILOXANE

The invention relates to an emulsion and more particularly to an acylated amino-functional organopolysiloxane emulsion and its preparation. The emulsion can be used in particular as a textile finishing agent.

BACKGROUND OF THE INVENTION

Emulsions of organopolysiloxanes containing amino groups have been used heretofore as textile finishing agents. Good soft handle effects are obtained with the textiles treated with these agents. However, the amino-functional group —(CH$_2$)$_3$NHCH$_2$CH$_2$NH$_2$ preferably used heretofore shows a strong tendency to thermal yellowing, a discoloration of the treated fibers which is accelerated by elevated temperatures.

A particularly effective reduction in thermal yellowing is achieved by reacting the amino-functional organopolysiloxanes with acylating agents, such as carboxylic acids and their anhydrides described in, for example, EP-A-349 753 and EP-A-349 754 (M. Ozake et al., published on Jan. 10, 1990 for Toray Silicone Co., Ltd., Japan), JP-A-57/101076 (K. Kodera et al., published on Jun. 23, 1982 for Nikka K.K. Co. Ltd., Japan) and EP-A-161 888 (T. J. Tangney et al., published on Nov. 21, 1985 for Dow Corning Corp., U.S.A.). Further acylating agents for reducing thermal yellowing are lactones, the use of which for modifying aminosilicone textile treatment agents is disclosed in, inter alia, EP-A-342 830 and EP-A-342 834 (S. E. Cray et al., published on May 5, 1989 for Dow Corning Ltd. Great Britain), carbonates, the use of which is disclosed in JP-A-90/47371 (S. Yokoyama et al., published Feb. 16, 1990 for Kyoeisha Yushi K.K. AG, Japan).

In all of the above processes the amino-functional organopolysiloxane is reacted in the form of an oil with the corresponding acylating agents. The viscosities of the oils, which are usually highly viscous, increase considerably as a result of the acylation. This leads to difficulties when emulsifying, since the viscosity impairs the mechanical miscibility and homogenization. In particular, the finished emulsions have relatively large particle sizes and broad particle size distributions. Therefore, the storage stability and shear stability of the emulsions are frequently unsatisfactory. When finishing textiles, emulsions of this type lead to non-uniform distribution of the silicone active compound on the textile substrate. Emulsions of this type can also lead to deposits on machine parts.

The acylating agents also reduce the soft handle effect of the treated textiles in the case of high degrees of acylation.

The reaction of amino-functional organopolysiloxanes with dialkyl oxalates and dialkyl pyrocarbonates as acylating agents in emulsions in order to reduce thermal yellowing and the use of the resulting emulsions as textile treatment agents is disclosed in U.S. Pat. No. 5,039,738 (A. M. Czech; issued on Aug. 13, 1991 for Union Carbide Corp., U.S.A.).

The dialkyl oxalates reduce thermal yellowing, but not to the same extent as, for example, acetic anhydride or dialkyl pyrocarbonates. In addition, because of their double reactivity towards amino groups

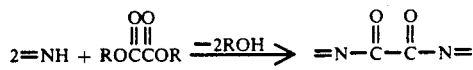

dialkyl oxalates tend to crosslink amino-functional polysiloxanes. This crosslinking can have an adverse effect on the storage stability of emulsion formulations due to premature precipitation and when used can lead to undesired deposits of crosslinked silicone material on machine parts, such as squeezing rollers and the like.

Dialkyl pyrocarbonates do give a satisfactory reduction in thermal yellowing, but have the disadvantage that CO$_2$ and alcohol are liberated during the reaction with amino-functional groups. However, the evolution of CO$_2$ can lead to undesired foaming, and the formation of alcohol, such as methanol, which is hazardous on toxicological grounds. Moreover, dialkyl pyrocarbonates are either not available in industrial amounts or are very expensive.

Therefore, it is an object of the present invention to provide an emulsion containing acylated amino-functional organopolysiloxanes. Another object of the present invention is to provide a simple process for preparing acylated amino-functional organopolysiloxane emulsions. Still another object of the present invention is to provide an emulsion having good storage stability. A further object of the present invention is to provide a stable emulsion which may be used as a textile finishing agent or from which a textile finishing agent can be prepared from said emulsion. A further object of the present invention is to provide a textile finishing agent which provides the treated textiles with good soft handle properties and also a low tendency to thermal yellowing.

SUMMARY OF THE INVENTION

The foregoing objects and others which will become apparent from the following description are accomplished in accordance with this invention, generally speaking, by providing a process for preparing emulsions containing acylated amino-functional organopolysiloxanes, which comprises reacting (A) an organopolysiloxane having at least one monovalent SiC-bonded radical containing primary and/or secondary amino groups, with (B) a carboxylic acid anhydride in the presence of (C) an emulsifier and (D) an aqueous phase.

The emulsions obtained from the process of this invention are useful as textile finishing agents.

DESCRIPTION OF THE INVENTION

The acylation reaction of (A) an organopolysiloxane with (B) carboxylic acid anhydride occurs in the presence of water, that is during and/or after the emulsification of the organopolysiloxane. The carboxylic acid anhydride serves as an acylating agent and does not react with water but reacts virtually exclusively with the amino groups of the organopolysiloxane (A). A loss of carboxylic acid anhydride (B) as a result of hydrolysis is barely detectable. The acylation reaction as a rule proceeds sufficiently rapidly at normal pressure and at room temperature and therefore requires neither elevated temperatures nor special catalysts to accelerate the reaction.

If the acylation is carried out during emulsification, it simplifies the process for preparing the emulsions containing acylated amino-functional organopolysiloxanes, because two process steps, the acylation and subsequent emulsification, are no longer necessary. In addition, the increasing viscosity of the organopolysiloxane (A), as a result of progressive acylation is compensated for by the dilution effect during emulsification. Emulsification problems and unsatisfactory particle size and poor shear stability because of a high viscosity are not present. When the acylation is carried out after emulsification it is possible to obtain even smaller particle sizes, since the amino-functional organopolysiloxanes (A), which are of relatively low viscosity, can be emulsified in very finely divided form. The present emulsions or microemulsions of amino-functional organopolysiloxanes (A), which have good storage stability, can, for example, be acylated to the desired degree of acylation prior to use as textile treating agents. The dilute emulsion and, preferably, the concentrate can be acylated. A suitable process for the preparation of finely divided organopolysiloxane emulsions is, for example, disclosed in EP-A-442 098 (K. Huhn et al., published on Aug. 21, 1991 for Wacker-Chemie GmbH, Munich). In this patent the emulsion is prepared in two steps using an emulsifier soluble in the organopolysiloxane (A), a concentrate being obtained in the first step, which concentrate is diluted with water in the second step.

Preferably, the organopolysiloxane (A) has at least one siloxane unit of the general formula

  (I)

and all other siloxane units have the general formula

  (II)

in which $R^1$ may be the same or different, represents monovalent $C_1$ to $C_{18}$ hydrocarbon radicals, monovalent $C_1$ to $C_{18}$ hydrocarbon radicals which are substituted by fluorine, chlorine or bromine atoms, hydrogen atoms, $C_1$ to $C_{12}$ alkoxy radicals or hydroxyl radicals or alkyl glycol radicals, Q represents a group of the general formula

  (III)

in which $R^2$ represents a divalent $C_1$ to $C_{18}$ hydrocarbon radical, $R^3$ represents a hydrogen atom or a $C_1$ to $C_{18}$ hydrocarbon radical or a fluorine-, chlorine- or bromine-substituted $C_1$ to $C_{18}$ hydrocarbon radical, a has a value of 0, 1 or 2, b has a value of 1, 2 or 3, c has a value 0, 1, 2 or 3, d has a value of 0, 1, 2, 3 or 4, m has a value of 2, 3, 4, 5 or 6 and the sum of a +b is no more than 4.

Examples of $C_1$ to $C_{18}$ hydrocarbon radicals are alkyl radicals, such as the methyl, ethyl, n-propyl, iso-propyl, n-butyl, isobutyl, tert-butyl, n-pentyl, iso-pentyl, neopentyl or tert-pentyl radicals; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; cycloalkyl radicals, such as cyclopentyl, cyclohexyl or cycloheptyl radicals and methylcyclohexyl radicals; aryl radicals, such as the phenyl radical and the naphthyl radical; alkaryl radicals, such as o-, m- and p-tolyl radicals, xylyl radicals and ethylphenyl radicals; and aralkyl radicals, such as the benzyl radical and the α- and the β-phenylethyl radical. The above hydrocarbon radicals optionally contain an aliphatic double bond. Examples are alkenyl radicals, such as the vinyl, allyl, 5-hexen-1-yl, E-4-hexen-1-yl, Z-4-hexen-1-yl, 2-(3-cyclohexenyl)-ethyl and cyclododeca-4,8-dienyl radical. Preferred radicals containing an aliphatic double bond are the vinyl, allyl and 5-hexen-1-yl radical.

Preferably, however, not more than about 1% of the hydrocarbon radicals contain a double bond.

Examples of $C_1$ to $C_{18}$ hydrocarbon radicals substituted by fluorine, chlorine or bromine atoms are the 3,3,3-trifluoro-n-propyl radical, the 2,2,2,2′,2′,2′-hexafluoroisopropyl radical, the heptafluoroisopropyl radical and the o-, m- and p-chlorophenyl radical.

Examples of divalent $C_1$ to $C_{18}$ hydrocarbon radicals represented by $R^2$ are saturated straight-chain or branched or cyclic alkylene radicals, such as the methylene and ethylene radicals and also propylene, butylene, pentylene, hexylene, 2-methylpropylene, cyclohexylene and octadecylene radicals, or unsaturated alkylene or arylene radicals, such as the hexenylene radical and phenylene radical, in which the n-propylene and the 2-methylpropylene radicals are particularly preferred.

The alkoxy radicals are alkyl radicals described above bonded via an oxygen atom. The examples for the alkyl radicals also apply to the alkoxy radicals.

The alkyl glycol radicals represented by $R^1$ preferably have the general formula

  (IV)

in which $R^2$, $R^3$ and d are the same as above, n has a value of from 1 to 100 and $R^4$ represents a hydrogen atom, a radical $R^3$ or a group of the general formula

where $R^5$ represents the radical $R^3$, or O—$R^3$.

In the above general formulas (I) to (IV) $R^1$ preferably represents a methyl, phenyl, $C_1$ to $C_3$ alkoxy or hydroxyl radical or a radical of the general formula (IV), $R^2$ preferably represents a divalent $C_2$ to $C_6$ hydrocarbon radical, $R^3$ preferably represents a hydrogen atom or a methyl radical, a preferably represents the value of 0 or 1, b preferably represents the value of 1, c preferably represents the value of 2 or 3 and d preferably represents the value of 1.

Straight-chain polydimethylsiloxanes, which optionally have $C_1$ to $C_3$ alkoxy or hydroxyl end groups, are particularly preferred. In these polydimethylsiloxanes Q preferably represents a $H_2N(CH_2)_2NH(CH_2)_3$— or $H_2N(CH_2)_2NHCH_2CH(CH_3)CH_2$— group.

The ratio of the siloxane units of general formula (I) to the siloxane units of general formula (II) is preferably from 1:10 to 30000, and in particular from 1:20 to 300. The amine content is preferably from 0.001 to 2 meq/g, and in particular from 0.1 to 1.0 meq/g, measured as consumption of 1 N hydrochloric acid in ml/g organopolysiloxane (A) on titration to the neutral point.

It is possible to use only one type of organopolysiloxane (A). However, it is also possible to use a mixture of at least two different types of organopolysiloxane (A).

The organopolysiloxane (A) or a mixture of at least two different types of organopolysiloxane (A) preferably has an average viscosity of from 50 to 100000 mPa·s, and more particularly from 100 to 10000 mPa·s, at 25° C.

The carboxylic acid anhydrides (B) used are preferably those of the general formula

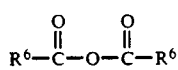  (V)

which $R^6$ is the same or different and represents hydrogen atoms or monovalent $C_1$ to $C_{18}$ hydrocarbon radicals, monovalent $C_1$ to $C_{18}$ hydrocarbon radicals substituted with fluorine, chlorine or bromine atoms, or hydrocarbon radical interrupted by oxygen atoms, or the two radicals $R^6$ are linked together to form an organic cyclic structure.

Anhydrides of monofunctional carboxylic acids of the general formulas $[R^3—CO]_2O$ and $[R^3—O(CH_2CH-R^3O)_eR^2—CO]_2O$, in which $R^2$ and $R^3$ are the same as above and e has a value of from 0 to 100, are particularly preferred. Mixed anhydrides of two different carboxylic acids may also be used.

The carboxylic acid anhydrides of the general formula $[H(CH_2)_fCO]_2O$ in which f has a value of from 1 to 19, and in particular 1 to 5, and also $[H(CH_2)_gO(CH_2CH_2O)_gCH_2—CO]_2O$ in which g has a value of from 1 to 20, are preferably used.

It is preferred that propionic anhydride and in particular acetic anhydride, be employed in which acylation of the amino groups of the organopolysiloxane (A) takes place exclusively, and the propionic anhydride and in particular the acetic anhydride does not react with water.

Cyclic anhydrides of difunctional carboxylic acids of the general formula

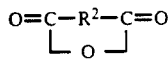

in which $R^2$ is the same as above, are particularly preferred. The cyclic anhydrides of difunctional carboxylic acids of the general formula

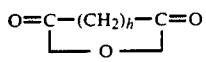

in which h has a value of from 2 to 8, are preferably used.

Succinic anhydride and maleic anhydride are particularly preferred.

Emulsifiers (C) which can be used are any desired emulsifiers which have been or could have been used heretofore in the preparation of organopolysiloxane emulsions and which are inert to the carboxylic acid anhydride.

Suitable anionic emulsifiers are, in particular:

1. Alkyl sulfates, especially those which have a chain length of from 8 to 18 C atoms, and alkyl ether sulfates which have 8 to 18 C atoms in the hydrophobic radical and 1 to 40 ethylene oxide (EO) or propylene oxide (PO) units.

2. Sulfonates, in particular alkylsulfonates having from 8 to 18 C atoms, alkylarylsulfonates having from 8 to 18 C atoms, taurides and esters and half-esters of sulfosuccinic acid with monohydric alcohols or alkylphenols having from 4 to 15 C atoms; in which the alcohols or alkylphenols can optionally be ethoxylated with from 1 to 40 EO units.

3. Alkali metal salts and ammonium salts of carboxylic acids having from 8 to 20 C atoms in the alkyl, aryl, alkaryl or aralkyl radical.

4. Phosphoric acid partial esters and their alkali metal salts and ammonium salts, and in particular alkyl phosphates and alkaryl phosphates having from 8 to 20 C atoms in the organic radical and alkyl ether-phosphates and alkaryl ether-phosphates having from 8 to 20 C atoms in the alkyl or alkaryl radical and from 1 to 40 EO units.

Suitable nonionic emulsifiers are, in particular:

1. Alkyl polyglycol ethers, preferably those having from 8 to 40 EO units and alkyl radicals of from 8 to 20 C atoms.

2. Alkylaryl polyglycol ethers, preferably those having from 8 to 40 EO units and from 8 to 20 C atoms in the alkyl and aryl radicals.

3. Ethylene oxide/propylene oxide (EO/PO) block copolymers, preferably those having from 8 to 40 EO and PO units.

4. Fatty acids having from 6 to 24 C atoms.

5. Natural substances and their derivatives, such as lecithin, lanolin, saponins and cellulose; cellulose alkyl ethers and carboxyalkylcelluloses, in which the alkyl groups each have up to 4 carbon atoms.

6. Straight-chain organo(poly)siloxanes containing polar groups, and in particular those containing alkoxy groups having up to 24 C atoms and/or up to 40 EO and/or PO groups.

Suitable cationic emulsifiers are, in particular:

1. Salts of primary, secondary and tertiary fatty amines having from 8 to 24 C atoms with acetic acid, sulfuric acid, hydrochloric acid and phosphoric acids.

2. Quaternary alkylbenzeneammonium salts, in particular those in which the alkyl group has from 8 to 24 C atoms, and in particular the halides, sulfates, phosphates and acetates.

3. Alkylpyridinium, alkylimidazolinium and alkyloxazolinium salts and in particular those in which the alkyl chain has up to 18 C atoms, especially the halides, sulfates, phosphates and acetates.

Additional suitable emulsifiers which may employed in the preparation of the emulsions are fatty acid polyglycol esters, polyethoxylated fatty acid glycerides and sorbitan esters, alkyl polyglycosides, fatty acid alkylolamides, alkyl ether-carboxylic acids, alkaryl ether-carboxylic acids, ethoxylated quaternary ammonium salts, amine oxides, betaines, sulfobetaines and sulfosuccinates.

The finished emulsions comprise a discontinuous oil phase, which contains the acylated organopolysiloxane (A), the emulsifiers and the continuous aqueous phase (D) (oil-in-water emulsion).

The weight ratios of the discontinuous oil phase to the continuous aqueous phase can be varied over a wide range. Generally, the proportion of the oil phase is from 5 to 60% by weight, preferably from 10 to 40% by weight, based on the total weight of the emulsion. The emulsifier content is preferably in the range of from 5 to 100% by weight, and in particular from 10 to 50% by weight, based on the weight of the oil phase.

Preferably from 0.5 to 100 mol %. and in particular from 20 to 80 mol%, of carboxylic acid anhydride (B) are used, based on the amino group content in the organopolysiloxane (A).

The preferred average particle size of the discontinuous oil phase is less than 140 nm, and in particular less than 120 nm. Average particle sizes of at most 100 nm and in particular at most 80 nm are particularly preferred.

As the average particle size decreases, not only does the storage stability and shear stability increase but the mechanical processibility is also improved. A more uniform distribution on the textile substrate is obtained and better penetration into the substrate is obtained. The textile substrates treated with finely divided emulsions have a particularly good soft handle.

The emulsion can contain any desired catalysts known per se for the condensation of condensable groups, such as alkoxy groups, directly bonded to silicon. Examples of such condensation catalysts are, in particular, carboxylic acid salts of tin or zinc, in which hydrocarbon radicals may be bonded directly to tin, such as di-n-butyltin dilaurate, tin octoates, di-2-ethyltin dilaurate, di-n-butyltin di-2-ethylhexoate, di-2-ethylhexyltin di-2-ethylhexoate, dibutyltin diacylates or dioctyltin diacylates, in which the acylate groups are derived from alkanoic acids having from 3 to 16 carbon atoms per acid, in which at least two of the valencies of the carbon atom bonded to the carboxyl group are saturated by at least two carbon atoms other than that of the carboxyl group, and zinc octoates. Additional examples of catalysts (3) are alkoxy titanates, such as butoxy titanates and triethanolamine titanate, and also zirconium compounds and aluminum compounds, and in particular their carboxylic acid salts and alcoholates.

The condensation catalyst is preferably used in amounts of from 0 to 10% by weight, based on the weight of the discontinuous oil phase.

For specific purposes, such as, for example, as a textile treatment agent, the emulsion can contain additives in addition to the above constituents. Suitable additives are, for example, biocides, such as fungicides, bactericides, algicides and microbicides, thickeners, antifreezes, antistatic agents, colorants, flameproofing agents and organic plasticizers.

The emulsion has very good storage stability and is readily dilutable and can be used for the treatment of organic fibers, such as filaments and yarns, and textile structures produced therefrom, such as nonwovens, mats, hanks and woven or knitted textiles, which have been or could have been impregnated heretofore with organosilicon compounds. Examples of fibers which can be impregnated are, for example, those composed of keratin, in particular wool, polyvinyl alcohol, copolymers of vinyl acetate, cotton, rayon, hemp, natural silk, polypropylene, polyethylene, polyester, polyurethane, polyamide, cellulose and mixtures of at least two such fibers. It is apparent from the above list, that the fibers can be of natural or synthetic origin. The textiles can be in the form of fabric webs or articles of clothing or parts of articles of clothing.

In the case of keratin, especially wool, shrinkage as a result of felting can be prevented by impregnation with the crosslinkable composition used as the textile treating agent, or a reaction product thereof, and in particular if the keratin was pretreated with chlorine, rinsed and neutralized.

The emulsion of this invention is applied to the fiber or the textile structure to be impregnated. The emulsion can, if necessary, be diluted to a suitable use concentration. In the application, additional additives, such as organic plasticizers, wax dispersions and additional catalysts, and in particular condensation catalysts, can be added to the emulsion.

The emulsion can be applied to the fibers and textile structures to be impregnated in any desired manner which is suitable for the impregnation of fibers and is widely known, for example by drawing, dipping, spreading, casting, spraying, including spraying from an aerosol pack, rolling on, padding or printing.

Preferably, the emulsion is applied in amounts such that the increase in weight of the fibers as a result of this composition, minus the diluent which is optionally used, is from 0.1 to 10% by weight, preferably from 0.5 to 4% by weight, based on the weight of the fibers.

The fibers and textile structures treated with the emulsion of this invention have a pleasant soft handle, are particularly resistant to thermal yellowing and have excellent properties in respect to hydrophilic character and soil release.

In the following examples all parts and percentages are by weight unless otherwise specified.

ICN represents the iodine color number according to DIN 6162.

EXAMPLE 1

About 334 g of an amino-functional silicone oil (A) of the formula (titratable amine content=0.3 meq/g, viscosity about 1000 mm$^2$/s, ICN=0)

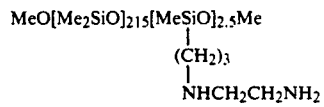

were mixed at room temperature with 6.1 parts by weight of acetic anhydride and then 50 parts by weight of the emulsifier Genapol ® X 060 (isotridecyl alcohol polyglycol ether containing 6 ethylene oxide units from Hoechst AG, Frankfurt). Immediately thereafter an emulsion concentrate was prepared by emulsifying with 60 parts by weight of water, and then the concentrate was diluted with 550 parts by weight of water. The emulsion contained an amine oil having a titratable amine content of 0.12 meq/g.

EXAMPLE 2

About 334 parts by weight of the amino-functional silicone oil (A) were reacted at room temperature with 6.1 parts by weight of acetic anhydride. The acetylated amine oil had a titratable amine content of 0.12 meq/g. The viscosity rose to 15000 mm$^2$/s and the oil showed slight yellowing (ICN=1). After a storage time of 14 days at room temperature with the exclusion of air, the acetylated oil had a titratable amine content of 0.12 meq/g, a viscosity of 49000 mm$^2$/s and an ICN of 2. After storing for 14 days, the acetylated oil was mixed with 50 parts by weight of the emulsifier Genapol ® X 060. An emulsion concentrate was prepared by emulsifying with 60 parts by weight of water, and then the concentrate was diluted with 550 parts by weight of water.

EXAMPLE 3

About 334 parts by weight of the amino-functional silicone oil (A) were mixed at room temperature with 50 parts by weight of the emulsifier Genapol ® X 060. An emulsion concentrate was prepared by emulsifying with 60 parts by weight of water. About 6.1 parts by weight of acetic anhydride were added and the mixture was then diluted with 550 parts by weight of water. The emulsion contained an amine oil having a titratable amine content of 0.12 meq/g.

EXAMPLE 4

About 170 parts by weight of the amino-functional silicone oil (B) having the following chemical structure (titratable amine content—0.6 meq/g)

$$Me_3SiO[Me_2SiO]_{215}[MeSiO]_5SiMe_3$$
$$\qquad\qquad\qquad\quad|$$
$$\qquad\qquad\qquad (CH_2)_3$$
$$\qquad\qquad\qquad\quad|$$
$$\qquad\qquad\quad NHCH_2CH_2NH_2$$

were mixed at room temperature with 60 parts by weight of the emulsifier Genapol ® X 060. An emulsion concentrate was prepared by emulsifying with 60 parts by weight of water, and then the concentrate was diluted with 555 parts by weight of water. About 5.1 parts by weight of acetic anhydride were added to the finely divided emulsion, which had an average particle size of less than 80 nm. After a reaction time of 10 minutes, the microemulsion contained an amine oil having a titratable amine content of 0.30 meq/g.

EXAMPLE 5

About 170 parts by weight of the amino-functional silicone oil (B) (titratable amine content=0.6 meq/g) were mixed at room temperature with 60 parts by weight of the emulsifier Genapol ® X 060. An emulsion concentrate was prepared by emulsifying with 60 parts by weight of water. About 3.5 parts by weight of acetic anhydride were added and the mixture was then diluted with 550 parts by weight of water. The finely divided emulsion contained an amine oil having a titratable amine content of 0.40 meq/g.

EXAMPLE 6

About 4.0 g of powdered succinic anhydride were added to a nonionic 35% water-in-oil (W/O) emulsion, which contained 235 g of the amino-functional silicone oil (C) having the following formula (titratable amine content=0.52 meq/g)

$$Me_3SiO[Me_2SiO]_{400}[MeSiO]_8SiMe_3$$
$$\qquad\qquad\qquad\quad|$$
$$\qquad\qquad\qquad (CH_2)_3$$
$$\qquad\qquad\qquad\quad|$$
$$\qquad\qquad\quad NHCH_2CH_2NH_2$$

at room temperature, with stirring. After 30 minutes the titratable amine content of the amino-functional silicone oil was 0.19 meq/g.

EXAMPLE 7

Applications assessment of the emulsions prepared in Examples 1 through 5:

7(a)—particle size

The average particle size was determined using the particle size measuring instrument Autosizer 2c from Mütek.

7(b)—shear stability

The emulsions to be tested were diluted with water to a solids content of 0.6%. The test solutions prepared in this manner were then tested to determine their shear stability (using a vane stirrer at 800 rpm for 5 minutes).

The appearance after the shear test was determined, in which the following ratings were used:
A: Appearance unchanged, no oil spots.
B: Slight oil spots on the surface.
C: Several more pronounced oil spots on the surface.
7(c)—textile finishing:

The emulsions to be tested were diluted with water to a solids content of 0.5% and applied to white cotton fabric by dipping and then compressed to remove the excess. The fabric was compressed in such a manner that a liquid uptake of 75%, with respect to the cotton weight, was obtained. The cotton knitted fabrics impregnated in this manner were then dried for 5 minutes at 150° C. and then subjected to the following tests:

Assessment of handle

The assessment was carried out by a manual test in accordance with a relative scale from 0 to 10, the value of 10 representing the best soft handle.

Yellowing

The degree of yellowing was determined using a color measuring instrument (Minolta Chromameter CR 200). The yellow value b+ measured was compared with the untreated sample as reference and recorded as $\Delta b+$: $\Delta b+ = b+$ (sample) - b+ (reference)

Decreasing yellowing signified lower $\Delta b+$ values.

TABLE 1

| Emulsion from Example | Particle size (nm) | Shear stability | Soft handle | $\Delta b+$ |
|---|---|---|---|---|
| 1 | 100 | A | 8 | +0.9 |
| 2 | 140 | B | 7 | +1.3 |
| 3 | 70 | A | 8 | +0.9 |
| 4 | 30 | A | 9 | +1.2 |
| 5 | 40 | A | 9 | +1.1 |
| Untreated | — | — | 0 | 0 |

What is claimed is:

1. A process for preparing emulsions of acylated amino-functional organopolysiloxanes, which comprises reacting (A) an organopolysiloxane containing at least one monovalent SiC-bonded radical having primary and/or secondary amino groups with (B) a carboxylic acid anhydride in the presence of (C) an emulsifier and (D) an aqueous phase.

2. The process of claim 1, wherein the acylation is carried out during or after emulsification.

3. The process of claim 1, wherein the carboxylic acid anhydride (B) is selected from the group consisting of the general formulas $$R^6-\overset{O}{\overset{\|}{C}}-O-\overset{O}{\overset{\|}{C}}-R^6 \qquad (V)$$

and $$O=C-R^2-C=O$$
$$\quad\; \lfloor\quad O\quad\rfloor$$

in which $R^2$ represents a divalent $C_1$ to $C_{18}$ hydrocarbon radical, $R^6$ is a hydrogen atom or a monovalent $C_1$ to $C_{18}$ hydrocarbon radical, or a monovalent $C_1$ to $C_{18}$ hydrocarbon radical substituted with a fluorine, chlorine or bromine atom, or a hydrocarbon radical interrupted by oxygen atoms.

4. An emulsion obtained from the process of claim 1.

5. The emulsion of claim 4, wherein the average particle size of the discontinuous oil phase is less than 140 nm.

6. A process for treating textile materials which comprises applying the emulsion prepared in accordance with the process of claim 1 to textile materials.

7. The process of claim 1, wherein the organopolysiloxane (A) has at least one siloxane unit of the general formula $$R^1_a Q_b SiO_{\frac{(4-a-b)}{2}} \quad \text{(I)}$$

and all other siloxane units have the general formula $$R^1_c SiO_{\frac{(4-c)}{2}} \quad \text{(II)}$$

in which $R^1$ is a hydrogen atom, a monovalent $C_1$ to $C_{18}$ hydrocarbon radical, a monovalent $C_1$ to $C_{18}$ hydrocarbon radical with a fluorine, chlorine or bromine atom, a $C_1$ to $C_{12}$ alkoxy radical or hydroxyl radical or an alkyl glycol radical, Q represents a group of the general formula $$-R^2-[NR^3(CH_2)_m]_d NHR^3 \quad \text{(III)}$$

in which $R^2$ represents a divalent $C_1$ to $C_{18}$ hydrocarbon radical, $R^3$ represents a hydrogen atom or a monovalent $C_1$ to $C_{18}$ hydrocarbon radical, a monovalent $C_1$ to $C_{18}$ hydrocarbon radical substituted with a fluorine-, chlorine- or bromine-atom, a has a value of 0, 1 or 2, b has a value of 1, 2 or 3, c has a value 0, 1, 2 or 3, d has a value of 0, 1, 2, 3 or 4, m has a value of 2, 3, 4, 5 or 6 and the sum of a+b is no more than 3.

* * * * *